United States Patent
Mueller et al.

(10) Patent No.: US 8,163,949 B2
(45) Date of Patent: Apr. 24, 2012

(54) METHOD FOR ELECTROCHEMICAL PRODUCTION OF A CRYSTALLINE POROUS METAL ORGANIC SKELETON MATERIAL

(75) Inventors: Ulrich Mueller, Neustadt (DE); Hermann Puetter, Neustadt (DE); Michael Hesse, Worms (DE); Markus Schubert, Ludwigshafen (DE); Helge Wessel, Mannheim (DE); Juergen Huff, Ludwigshafen (DE); Marcus Guzmann, Muehlhausen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/987,548

(22) Filed: Jan. 10, 2011

(65) Prior Publication Data

US 2011/0105776 A1    May 5, 2011

Related U.S. Application Data

(62) Division of application No. 10/580,407, filed as application No. PCT/EP2004/013236 on Nov. 22, 2004, now Pat. No. 7,968,739.

(30) Foreign Application Priority Data

Nov. 24, 2003 (DE) .................................. 103 55 087

(51) Int. Cl.
*C07F 1/00* (2006.01)
*C07F 3/00* (2006.01)
*C07F 15/00* (2006.01)

(52) U.S. Cl. .......................... 556/115; 556/132; 556/147

(58) Field of Classification Search .................. 556/115, 556/132, 147
See application file for complete search history.

(56) References Cited

U.S. PATENT DOCUMENTS

| | | |
|---|---|---|
| 4,104,140 A | 8/1978 | Eisenbach et al. |
| 4,599,150 A | 7/1986 | Mullin et al. |
| 5,648,508 A | 7/1997 | Yaghi |
| 6,617,467 B1 | 9/2003 | Mueller et al. |
| 6,624,318 B1 | 9/2003 | Mueller et al. |
| 6,893,564 B2 | 5/2005 | Mueller et al. |
| 6,929,679 B2 | 8/2005 | Mueller et al. |
| 7,008,607 B2 | 3/2006 | Mueller et al. |
| 2003/0078311 A1 | 4/2003 | Muller et al. |
| 2003/0148165 A1 | 8/2003 | Muller et al. |
| 2004/0097724 A1 | 5/2004 | Muller et al. |
| 2004/0265670 A1 | 12/2004 | Muller et al. |
| 2005/0004404 A1 | 1/2005 | Muller et al. |
| 2005/0154222 A1 | 7/2005 | Muller et al. |

FOREIGN PATENT DOCUMENTS

DE            202 10 139            6/2003

(Continued)

OTHER PUBLICATIONS

Eddaoudi, Mohamed et al., "Systematic Design of Pore Size and Functionality in Isoreticular MOFs and Their Application in Methane Storage", Science, vol. 295, pp. 469-472, 2002.

(Continued)

*Primary Examiner* — Porfirio Nazario Gonzalez
(74) *Attorney, Agent, or Firm* — Oblon, Spivak, McClelland, Maier & Neustadt, L.L.P.

(57) ABSTRACT

A method of electrochemically preparing a crystalline, porous, metal-organic framework material comprising at least one at least bidentate organic compound coordinately bound to at least one metal ion, in a reaction medium comprising the at least one bidentate organic compound, wherein at least one metal ion is provided in the reaction medium by the oxidation of one anode comprising the corresponding metal.

28 Claims, 5 Drawing Sheets

FOREIGN PATENT DOCUMENTS

| | | |
|---|---|---|
| FR | 2 202 060 | 5/1974 |
| FR | 2 389 636 | 12/1978 |
| FR | 2 708 002 | 1/1995 |
| JP | 58-73780 | 5/1983 |
| JP | 9-227571 | 9/1997 |
| WO | 02/070526 | 9/2002 |
| WO | 02/088148 | 11/2002 |

OTHER PUBLICATIONS

Chen, Banglin et al., "Interwoven Metal-Organic Framework on a Periodic Minimal Surface with Extra-Large Pores", Science, Vo. 291, pp. 1021-1023, 2001.

Mori, Wasuke et al., "Synthesis of New Adsorbent Copper(II) Terephthalate", Chemistry Letters, pp. 1219-1220, 1997.

Chui, Stephens S.-Y. et al., A Chemically Functionalizable Nanoporous Material $[Cu_3(TMA)_2(H_2O)_3]_n$, Science, vol. 283, pp. 1148-1150, 1999.

Xiuyan, "Metal-organic Coordination Polymers: Synthesis, Crystal Structures and Applications to Functional Coatings", PHD thesis of Beijing University of Chemical Technology, Dec. 31, 2002, 4 pages.

International Search Report mailed May 6, 2005, in PCT/EP2004/013236, filed Nov. 22, 2004.

Office Action issued Apr. 17, 2009, in Chinese Patent Application No. 2004800346790 filed Nov. 22, 2004.

METHOD FOR ELECTROCHEMICAL PRODUCTION OF A CRYSTALLINE POROUS METAL ORGANIC SKELETON MATERIAL

This application is a divisional application of U.S. application Ser. No. 10/580,407, filed on May 24, 2006, which is a 371 of PCT/EP04/13236, filed on Nov. 22, 2004, and claims priority to German Patent Application No. 103 55 087.9, filed on Nov. 24, 2003.

The present invention relates to a method of electrochemically preparing a crystalline, porous, metal-organic framework material. In the scope of this method, the metal ion present in the framework material is provided at least in part via anodic oxidation. The present invention also relates to the inventively prepared framework material per se and to preferred uses, for example as a storage medium for liquids and gases.

Crystalline, porous, metal-organic framework materials, so-called "metal-organic frameworks" (MOF) having specific pores or pore distributions and large specific surface areas have been the subject, particularly most recently, of extensive research activities.

For example, U.S. Pat. No. 5,648,508 describes microporous, metal-organic materials which are prepared under mild reaction conditions from a metal ion and a ligand in the presence of a template compound.

WO 02/088148 discloses the preparation of a series of compounds having the same framework topology. These so-called IMOF (Isoreticular Metal-Organic Framework) structures represent monocrystalline and mesoporous framework materials having a very high storage capacity for gases.

Eddaoudi et al., Science, 295 (2002) p. 469-472, for example describes the preparation of a so-called MOF-5, the starting material being a zinc salt, i.e. zinc nitrate, the synthesis of the MOF involving dissolving this salt and 1,4-benzenedicarboxylic acid (BDC) in N,N'-diethylformamide (DEF).

Chen et al., Science, 291 (2001) p. 1021-1023, for example describes the preparation of a so-called MOF-14, the starting material being a copper salt, i.e. copper nitrate, the synthesis of the MOF involving dissolving this salt and 4,4',4"-benzene-1,3,5-triyltribenzoic acid ($H_3BTC$) in N,N'-dimethylformamide (DMF) and water.

Accordingly, in all the methods described in the prior art of preparing these porous, metal-organic framework materials, the metal ion to which the ligands are coordinatively bound is provided via a corresponding metal salt solution, in each case a solution which comprises the dissolved metal salt being brought into contact with a ligand in the presence of a suitable template compound.

This procedure does entail serious safety problems since, for example, the preparation of copper-containing metal-organic framework materials in many cases involves the presence in the solution, besides copper ions, of nitrate anions which are introduced into the reaction system via the copper salt. The synthesis then results in large-surface-area metal complexes in concentrated, nitrate-containing phases, the phases additionally comprising organic solvents. Such phases, when overheated, can have a tendency to decompose spontaneously. If, on the other hand, as likewise described in the prior art in many cases, a solution on the basis of halides is used instead of a nitrate-containing metal salt solution, this will result, in industrial applications, in the rapid corrosion of apparatus components, thus requiring expensive corrosion-resistant materials.

One of the objects of the present invention therefore was to provide a method which does not have these drawbacks.

We have found that this object is achieved by a method based on an entirely different approach, in which the metal ion to which the ligand of the framework material is coordinatively bound is provided not via a metal salt but via an electrochemical route. In the scope of the present invention, the introduction of the at least one metal ion in the metal-organic framework material into the reaction system is therefore effected, at least in part, via anodic oxidation.

Accordingly, the present invention relates to a method of electrochemically preparing a crystalline, porous, metal-organic framework material comprising at least one at least bidentate organic compound coordinately bound to at least one metal ion, in a reaction medium comprising the at least one bidentate organic compound, wherein at least one metal ion is provided in the reaction medium by the oxidation of at least one anode comprising the corresponding metal.

The term "electrochemical preparation" as employed within the scope of the present invention relates to a preparation method in which the formation of at least one reaction product is attendant on the migration of electrical charges or the occurrence of electrical potentials.

The term "at least one metal ion" as used within the scope of the present invention relates to embodiments according to which at least one ion of a metal or at least one ion of a first metal and at least one ion of at least one second metal differing from the first metal are provided by anodic oxidation.

Accordingly, the present invention comprises embodiments in which at least one ion of at least one metal is provided via anodic oxidation and at least one ion of at least one metal is provided via a metal salt, where the at least one metal in the metal salt and the at least one metal provided via anodic oxidation as a metal ion can be identical or different from one another. The present invention therefore comprises, for example, an embodiment according to which the reaction medium comprises one or more different salts of a metal and the metal ion present in this salt or these salts is additionally provided via anodic oxidation of at least one anode comprising said metal. Likewise, the present invention comprises an embodiment according to which the reaction medium comprises one or more different salts of at least one metal and at least one metal different from these metals is provided via anodic oxidation as a metal ion in the reaction medium.

According to a preferred embodiment of the present invention, the at least one metal ion is provided via anodic oxidation of at least one anode comprising said at least one metal, no further metal being provided via a metal salt.

Accordingly, the present invention comprises an embodiment, according to which the at least one anode comprises a single metal or two or more metals, in the case of the anode comprising a single metal, said metal being provided by anodic oxidation, and in the case of the anode comprising two or more metals, at least one of said metals being provided via anodic oxidation.

The present invention further comprises an embodiment according to which at least two anodes are used, these two being optionally identical or different. Each of the at least two anodes in this arrangement can comprise a single metal or two or more metals. In this context it is possible, for example, for two different anodes to comprise the same metals, but in different proportions. Equally it is possible, for example, in the case of different anodes for a first anode to comprise a first metal and a second anode to comprise a second metal, the first anode not comprising the second metal and/or the second anode not comprising the first metal.

The term "metal" as used within the scope of the present invention comprises all those elements of the Periodic Table of the Elements which can be provided in a reaction medium via anodic oxidation via an electrochemical route and are able to form at least one metal-organic, porous framework material with at least one at least bidentate organic compound.

Especially preferred in the scope of the present invention are elements of groups Ia, IIa, IIIa, IVa to VIIIa and Ib and VIb of the periodic table of the elements. These preferred elements include Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb and Bi. More preferred are Zn, Cu, Ni, Pd, Pt, Ru, Rh, Fe, Mn, Ag and Co. Greater preference within the scope of the present invention is given to Cu, Fe, Co, Zn, Mn and Ag. Especially preferred are Cu, Fe and Zn.

Among metal ions provided via anodic oxidation in the reaction medium, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Ti^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{3+}$, $Sb^{+}$, $Bi^{5+}$, $Bi^{3+}$ and $Bi^{+}$ can be mentioned in particular. Particularly preferred are $Cu^{2+}$, $Cu^{+}$, $Fe^{2+}$, $Fe^{3+}$, $Zn^{2+}$, $Co^{3+}$, $Co^{2+}$, $Ag^{+}$, $Mg^{2+}$ and $Mn^{2+}$. Especially preferred are $Cu^{2+}$, $Cu^{+}$, $Fe^{2+}$, $Fe^{3+}$ and $Zn^{2+}$.

Accordingly, the present invention also describes a method as described above, wherein the metal ion source used is a copper- and/or an iron- and/or a zinc- and/or a silver- and/or a manganese-comprising anode.

Likewise, the present invention also describes a method as described above, wherein the metal ion source used is a copper- and/or an iron- and/or a zinc- and/or a manganese-comprising anode.

According to a preferred embodiment, the present invention also relates to a method as described above, wherein the metal ion source used is a copper- and/or an iron- and/or a zinc-comprising anode.

The configuration of the anode employed in the method according to the invention can in principle be chosen at will, as long as the ability to provide the at least one metal ion in the reaction medium via anodic oxidation to form the porous, metal-organic framework material is ensured.

Preferred, inter alia are anodes in the form of a rod and/or an annulus and/or a disk such as, for example, an annular disk and/or a plate and/or a tube and/or a bed and/or a cylinder and/or a cone and/or a truncated cone.

According to a preferred embodiment, the method according to the invention is implemented employing at least one sacrificial anode. The term "sacrificial anode" as used within the scope of the present invention refers to an anode which in the course of the inventive method dissolves, at least in part. This also includes embodiments in which at least part of the dissolved anode material is replaced in the course of the process. This can be effected, for example, by at least one new anode being introduced into the reaction system or, according to a preferred embodiment, an anode being introduced into the reaction system and in the course of the inventive method being fed forward continuously or discontinuously into the reaction system.

The method according to the invention preferably makes use of anodes which consist of the at least one metal serving as the metal ion source or which comprise said at least one metal applied to at least one suitable support material.

The geometry of the at least one support material is essentially not subject to any restrictions. Possible options include, for example, the use of support materials in the form of a fabric and/or a sheet and/or a felt and/or a screen and/or rod and/or a cartridge and/or a cone and/or a truncated cone and/or an annulus and/or a disk and/or a plate and/or a tube and/or a bed and/or a cylinder.

Potentially suitable support materials according to the invention include, for example, metals such as e.g. at least one of the abovementioned metals, alloys such as e.g. steels or bronzes or brass, graphite, felt or foams.

Most especially preferred are anodes which consist of the at least one metal serving as the metal ion source.

The configuration of the cathode employed in the method according to the invention can in principle be chosen at will, as long as the ability to provide the at least one metal ion in the reaction medium via anodic oxidation to form the porous, metal-organic framework material is ensured.

According to a preferred embodiment of the method according to the invention, the electroconductive electrode material of the at least one cathode is selected so as to ensure that no troublesome side reaction takes place in the reaction medium. Cathode materials preferred inter alia include, inter alia, graphite, copper, zinc, tin, manganese, silver, gold, platinum or alloys such as e.g. steels, bronzes or brass.

Examples of combinations preferred inter alia of the anode material serving as the metal ion source and of the electroconductive cathode material include:

| Anode | Cathode |
| --- | --- |
| Zinc | Zinc |
| Copper | Copper |
| Magnesium | Copper |
| Cobalt | Cobalt |
| Iron | Steel |
| Copper | Steel |

The geometry of the at least one cathode is essentially subject to no restrictions. Possible options include, for example, the use of cathodes in the form of a rod and/or an annulus and/or a disk and/or a plate and/or a tube.

Within the scope of the present invention, essentially any cell type customarily used in electrochemistry can be employed. Most especially preferred in the method according to the invention is an electrolytic cell suitable for the use of sacrificial electrodes.

In principle it is possible, inter alia, to employ split cells with, for example, a plan parallel electrode arrangement or cartridge-type electrodes. The separation medium used between the cell compartments can, for example, be ion exchange membranes, microporous membranes, diaphragms, filter fabrics from electron-nonconducting materials, glass frits and/or porous ceramic materials. Preference is given to the use of ion exchange membranes, particularly cation exchange membranes, preference among these being given in turn to those membranes which comprise a copolymer of tetrafluoroethylene and a perfluorinated monomer comprising sulfonic acid groups.

Within the scope of a preferred embodiment of the method according to the invention, preference is given to the use of one or more undivided cells.

Accordingly, the present invention also relates to a method as described above which is implemented in an undivided electrolytic cell.

Most especially preferred are combinations of geometries of anode and cathode in which those sides of the anode and cathode which face one another jointly form a gap of homogeneous thickness.

In the at least one undivided cell, the electrodes are, for example, preferably arranged plan parallel, the electrode gap having a homogeneous thickness, for example, in the range of from 0.5 mm to 30 mm, preferably in the range of from 0.75 mm to 20 mm and particularly preferably in the range of from 1 to 10 mm.

Within the scope of a preferred embodiment it is possible for example, for a cathode and an anode to be arranged plan parallel in such a way that in the resulting cell an electrode gap is formed having a homogeneous thickness in the range of from 0.5 to 30 mm, preferably in the range of from 1 to 20 mm, more preferably in the range of from 5 to 15 mm and particularly preferably in the range of from 8 to 12 mm, for example in the range of about 10 mm. This type of cell is referred to, within the scope of the present invention, by the term "gap cell".

According to a preferred embodiment of the method according to the invention, the above-described cell is employed as a cell connected for bipolar operation.

In addition to the above-described cell, a likewise preferred embodiment within the scope of the method according to the invention employs the electrodes singly or a plurality of them stacked on top of one another. In the latter case, these are so-called stack electrodes which are preferably serially connected for bipolar operation in the accordingly so-called plate stack cell. Particularly when the method according to the invention is implemented on an industrial scale, preferably at least one cup cell and particularly preferably plate stack cells connected in series are used, whose fundamental configuration is described in DE 195 33 773 A1 which is incorporated by reference.

Within the scope of the preferred embodiment of the plate stack cell, it is preferred, for example, for disks of suitable materials such as e.g. copper disks to be arranged in a plan parallel manner in such a way that, between the individual disks in each case, a gap is formed having a homogeneous thickness in the range of from 0.5 to 30 mm, preferably in the range of from 0.6 to 20 mm, more preferably in the range of from 0.7 to 10 mm, more preferably in the range of from 0.8 to 5 mm and particularly in the range of from 0.9 to 2 mm, for example in the range of about 1 mm. In this arrangement, the spacings between the individual disks can be identical or different, the spacings between the disks according to a particularly preferred embodiment being essentially equal. According to a further embodiment, the material of one disk of the plate stack cell can differ from the material of another disk of the plate stack cell. For example, one disk can be made of graphite, another disk made of copper, the copper disk preferably being connected as the anode and the graphite disk preferably being connected as the cathode.

It is also preferred, for example, within the scope of the present invention to use so-called "pencil sharpener" cells as described, for example, in J. Chaussard et al., J. Appl. Electrochem. 19 (1989) 345-348, which is incorporated by reference. Particular preference is given in the method according to the invention to pencil sharpener electrodes having rod-shaped feed electrodes.

In particular, the present invention accordingly also relates to a method as described above which is implemented in a gap cell or plate stack cell.

Cells in which the electrode gap is in the range of less than or equal to 1 mm are referred to as capillary gap cells.

According to likewise preferred embodiments of the method according to the invention, electrolytic cells can be used which, for example, have porous electrodes comprising metal beds or, for example, have porous electrodes comprising metal meshes or, for example, have electrodes comprising both metal beds and metal meshes.

According to a further preferred embodiment, the method according to the invention makes use of electrolytic cells which have at least one sacrificial anode of round, disk-shaped cross section and at least one cathode of annular cross section, the diameter of the preferably cylindrical anode particularly preferably being smaller than the internal diameter of the cathode, and the anode being disposed in such a way within the cathode that a gap of homogeneous thickness is formed between the outer face of the cylindrical shell of the anode and the inner face of the cathode which at least partially surrounds the anode.

Within the scope of the present invention it is also possible to reverse polarity and thus convert the original anode into the cathode and the original cathode into the anode. Within the scope of this variant of the method it is possible, for example, if electrodes comprising different metals are suitably selected, to provide first one metal via anodic oxidation as the metal cation to build up the metal-organic framework material and, in a second step after polarity reversal, to provide a second metal to build up the metal-organic framework material. It is also possible to effect polarity reversal by applying an AC current.

In principle it is possible for the method to be implemented in batch mode or continuously or in mixed-mode operation. Preferably, the method is implemented continuously in at least one flow cell.

The voltages employed in the method according to the invention can be adapted to the at least one metal which is present in the at least one anode and serves as the metal ion source for the porous, metal-organic framework material and/or to the properties of the at least one bidentate organic compound and/or if appropriate to the properties of the below-described at least one solvent and/or if appropriate to the properties of the below-described at least one conducting salt and/or to the properties of the below-described at least one cathodic depolarization compound.

In general, the voltages per electrode pair are in the range of from 0.5 to 100 V, preferably in the range of from 2 to 40 V, particularly preferably in the range of from 4 to 20 V. Examples of preferred ranges are from 4 to 10 V or from 10 to 20 V or from 20 to 25 V or from 10 to 25 V or from 4 to 20 V or from 4 to 25 V. In this context, the voltage can be constant during the inventive method or can change continuously or discontinuously in the course of the method.

In the case, for example, of copper being oxidized anodically, the voltages are generally in the range of from 3 to 20 V, preferably in the range of from 3.5 to 15 V and particularly preferably in the range of from 4 to 15 V.

The current densities which occur within the scope of the inventive preparation of the porous, organic framework materials are generally in the range of from 0.01 to 1000 mA/cm$^2$, preferably in the range of from 0.1 to 1000 mA/cm$^2$, more preferably in the range of from 0.2 to 200 mA/cm$^2$, more preferably in the range of from 0.3 to 100 mA/cm$^2$ and particularly preferably in the range of from 0.5 to 50 mA/cm$^2$.

The quantities of electricity (Ah) employed in the method according to the invention are preferably in the range of from 30 to 200% of the quantity of electricity required to neutralize the amount of the preferably employed acid equivalence of the at least one at least bidentate compound.

The method according to the invention is generally implemented at a temperature in the range of from 0° C. up to a boiling point, preferably in the range of from 20° C. up to the boiling point of the reaction medium in question or of the at least one solvent employed, preferably at atmospheric pressure. Equally it is possible to implement the method under pressure, pressure and temperature preferably being chosen such that the reaction medium is preferably at least partially liquid.

In general, the method according to the invention is implemented at a pressure in the range of from 0.5 to 50 bar, preferably in the range of from 1 to 6 bar and particularly preferably at atmospheric pressure.

Depending on type and state of aggregation of the components of the reaction medium, the electrochemical preparation according to the invention of the porous, metal-organic framework material can in principle also be carried out without an additional solvent. This is particularly the case, for example, if at least one of the at least bidentate compounds in the reaction medium acts as a solvent or solvent mixture.

Equally it is possible, in principle, without employing a solvent to implement the method according to the invention, for example, in the melt, at least one component of the reaction medium being present in the molten state.

According to a preferred embodiment of the present invention, the reaction medium comprises at least one suitable solvent in addition to the at least one at least bidentate organic compound and the optional at least one conducting salt and the optional at least one cathodic depolarization compound. In that case, the chemical nature and the amount of said at least one solvent can be adapted to the at least one at least bidentate organic compound and/or to the at least one conducting salt and/or to the at least one cathodic depolarization compound and/or to the at least one metal ion.

Accordingly, the present invention also describes a method as described above, wherein the reaction medium, in addition to the at least one at least bidentate organic compound, additionally comprises at least one solvent.

Conceivable in principle as the solvent are all solvents or all solvent mixtures in which the starting materials employed in the method can be at least partially dissolved or suspended under the reaction conditions chosen such as pressure and temperature. Examples of preferentially used solvents include inter alia water;
alcohols having 1, 2, 3 or 4 carbon atoms such as methanol, ethanol, n-propanol, isopropanol, n-butanol, isobutanol, t-butanol;
carboxylic acids having 1, 2, 3 or 4 carbon atoms such as formic acid, acidic acid, propionic acid or butanoic acid;
nitriles such as e.g. acetonitrile or cyanobenzene;
ketones such as e.g. acetone;
at least singly halogen-substituted low-molecular-weight alkanes such as e.g. methylene chloride or 1,2-dichloroethane;
acid amides such as e.g. amides of low-molecular-weight carboxylic acids such as e.g. carboxylic acids having 1, 2, 3 or 4 carbon atoms such as amides of formic acid, acetic acid, propionic acid or butanoic acid such as e.g. formamide, dimethylformamide (DMF), diethylformamide (DEF), t-butylformamide, acetamide, dimethylacetamide, diethylacetamide or t-butylacetamide;
cyclic ethers such as e.g. tetrahydrofuran or dioxane;
N-formylamides or N-acetylamides or symmetric or asymmetric urea derivatives of primary, secondary or cyclic amines such as e.g. ethylamine, diethylamine, piperidine or morpholine;
amines such as e.g. ethanolamine, triethylamine or ethylenediamine;
dimethyl sulfoxide;
pyridine;
trialkyl phosphites and phosphates;

or mixtures of two or more of the abovementioned compounds.

The term "solvents" as used above includes both pure solvents and solvents comprising, in small amounts, at least one further compound, for example preferably water. In this case, the water contents of the abovementioned solvents are in the range of up to 1 wt %, preferably in the range of up to 0.5 wt %, particularly preferably in the range of from 0.01 to 0.5 wt % and especially preferably in the range of from 0.1 to 0.5 wt %. The term "methanol" or "ethanol" or "acetonitrile" or "DMF" or "DEF", for example, is to be understood, within the scope of the present invention, to include a solvent which in each case, particularly preferably, can comprise water in the range of from 0.1 to 0.5 wt %.

Preferred solvents used in the method according to the invention are methanol, ethanol, acetonitrile, DMF and DEF or mixtures of two or more of these compounds. Most especially preferred solvents are methanol, ethanol, DMF, DEF and mixtures of two or more of these compounds.

Within the scope of a preferred embodiment, the solvent used comprises at least one protic solvent. This is preferentially employed, inter alia, in those cases where, to avoid the below-described redeposition, on the cathode, of the at least one metal ion provided by anodic oxidation, the cathodic generation of hydrogen is to be effected.

If, for example, methanol is used as the solvent, the temperature in the method according to the invention at atmospheric pressure is generally in the range of from 0 to 90° C.; preferably in the range of from 0 to 65° C. and particularly preferably in the range of from 25 to 65° C.

If, for example, ethanol is used as the solvent, the temperature in the method according to the invention at atmospheric pressure is generally in the range of from 0 to 100° C.; preferably in the range of from 0 to 78° C. and particularly preferably in the range of from 25 to 78° C.

The pH of the reaction medium in the method according to the invention is adjusted so as to favor the synthesis or the stability or preferably the synthesis and the stability of the framework material. For example, the pH can be adjusted via the at least one conducting salt.

If the reaction is carried out as a batch reaction, the reaction duration is generally in the range of up to 30 h, preferably in the range of up to 20 h, more preferably in the range of from 1 to 10 h and particularly preferably in the range of from 1 to 5 h.

The term "at least bidentate organic compound" as used within the scope of the present invention refers to an organic compound comprising at least one functional group which is able to form at least two, preferably two coordinative bonds to a given metal ion and/or to form one coordinative bond each to two or more, preferably two metal atoms.

Examples of functional groups to be mentioned, via which the said coordinative bonds can be formed, include the following functional groups in particular: $-CO_2H$, $-CS_2H$, $-NO_2$, $-B(OH)_2$, $-SO_3H$, $-Si(OH)_3$, $-Ge(OH)_3$, $-Sn(OH)_3$, $-Si(SH)_4$, $-Ge(SH)_4$, $-Sn(SH)_3$, $-PO_3H$, $-AsO_3H$, $-AsO_4H$, $-P(SH)_3$, $-As(SH)_3$, $-CH(RSH)_2$, $-C(RSH)_3$, $-CH(RNH_2)_2$, $-C(RNH_2)_3$, $-CH(ROH)_2$, $-C(ROH)_3$, $-CH(RCN)_2$, $-C(RCN)_3$, where R, for example, is preferably an alkylene group having 1, 2, 3, 4 or 5 carbon atoms such as e.g. a methylene, ethylene, n-propylene, i-propylene, n-butylene, i-butylene, t-butylene or n-pentylene group or an aryl group containing one or two aromatic nuclei such as e.g. two $C_6$ rings which may or may not be condensed and, independently of one another, can be substituted in a suitable manner by at least one substituent each, and/or which, independently of one another, can each contain at least one heteroatom such as e.g. N, O and/or S. In accordance with likewise preferred embodiments, functional groups should be mentioned in which the abovementioned radical R is not present. To be mentioned among these are, inter alia, —CH(SH)$_2$, —C(SH)$_3$, —CH(NH$_2$)$_2$, —C(NH$_2$)$_3$, —CH(OH)$_2$, —C(OH)$_3$, —CH(CN)$_2$ or —C(CN)$_3$.

The at least two functional groups can in principle be bound to any suitable organic compound, as long as there is the assurance that the organic compound having these functional groups is capable of forming the coordinative bond and of producing the framework material.

The organic compounds comprising the at least two functional groups are preferably derived from a saturated or unsaturated aliphatic compound or an aromatic compound or a compound which is both aliphatic and aromatic.

The aliphatic compound or the aliphatic moiety of the both aliphatic and aromatic compound can be linear and/or branched and/or cyclic, a plurality of cycles per compound also being possible. More preferably, the aliphatic compound or the aliphatic moiety of the both aliphatic and aromatic compound comprises from 1 to 15, more preferably from 1 to 14, more preferably from 1 to 13, more preferably from 1 to 12, more preferably from 1 to 11 and particularly preferably from 1 to 10 C atoms such as e.g. 1, 2, 3, 4, 5, 6, 7, 8, 9 or 10 C atoms. Particularly preferred in this context are, inter alia, methane, adamantane, acetylene, ethylene or butadiene.

The aromatic compound or the aromatic moiety of the both aromatic and aliphatic compound can have one or alternatively more nuclei such as e.g. 2, 3, 4 or 5 nuclei, with the option of the nuclei being separate and/or at least two nuclei being present in condensed form. Particularly preferably, the aromatic compound or the aromatic moiety of the both aliphatic and aromatic compound has 1, 2 or 3 nuclei, one or two nuclei being especially preferred. Independently of one another, each nucleus of the abovementioned compound may further comprise at least one heteroatom such as e.g. N, O, S, B, P, Si, Al, preferably N, O and/or S. More preferably, the aromatic compound or the aromatic moiety of the both aromatic and aliphatic compound comprises one or two C$_6$ nuclei, the two nuclei being either separate or being present in condensed form. Aromatic compounds to be mentioned in particular are benzene, naphthalene and/or biphenyl and/or bipyridyl and/or pyridine.

Examples to be mentioned, inter alia are trans-muconic acid or fumaric acid or phenylenebisacrylic acid.

Examples to be mentioned within the scope of the present invention of dicarboxylic acids are
1,4-butanedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octanedicarboxylic acid, pentane-3,3-carboxylic acid, 4,4'-diamino-1,1'-diphenyl-3,3'-dicarboxylic acid, 4,4'-diaminodiphenyl-3,3'-dicarboxylic acid, benzidine-3,3'-dicarboxylic acid, 1,4-bis-(phenylamino)benzene-2,5-dicarboxylic acid, 1,1'-dinaphthyl-8,8'-dicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7,-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxaundecanedicarboxylic acid, o-hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, 4,4'-diaminodiphenyletherdiimidedicarboxylic acid, 4,4'-diaminodiphenylmethanediimidedicarboxylic acid, 4,4'-diaminodiphenylsulfonediimidedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenedicarboxylic acid, 8-sulfo-2,3-naphthalenedicarboxylic acid, anthracene-2,3-dicarboxylic acid, 2'-3'-diphenyl-p-terphenyl-4,4''-dicarboxylic acid, diphenylether-4,4'-dicarboxylic acid, imidazole-4,5-dicarboxylic acid, 4(1H)-oxothiochromene-2,8-dicarboxylic acid, 5-t-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptanedicarboxylic acid, 5-hydroxy-1,3-benzenedicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid or 5-ethyl-2,3-pyridinedicarboxylic acid,
of tricarboxylic acids are
2-hydroxy-1,2,3-propanetricarboxylic acid, 7-chloro-2,3,8-quinolinetricarboxylic acid, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurinetricarboxylic acid, or of tetracarboxylic acids are 1,1-dioxide-perylo[1,12-BCD]thiophene-3,4,9,10-tetracarboxylic acid, perylenetetracarboxylic acids such as perylene-3,4,9,10-tetracarboxylic acid or perylene-1,12-sulfone-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

Most especially preferred within the scope of the present invention is the use, where suitable, of at least monosubstituted mono-, di-, tri-, tetra- or polynuclear aromatic di, tri- or tetracarboxylic acids, each of the nuclei optionally comprising at least one heteroatom, where two or more nuclei may comprise identical or different heteroatoms. Preferred, for example, are mononuclear dicarboxylic acids, mononuclear tricarboxylic acids, mononuclear tetracarboxylic acids, dinuclear dicarboxylic acids, dinuclear tricarboxylic acids, dinuclear tetracarboxylic acids, trinuclear dicarboxylic acids, trinuclear tricarboxylic acids, trinuclear tetracarboxylic acids, tetranuclear dicarboxylic acids, tetranuclear tricarboxylic acids and/or tetranuclear tetracarboxylic acids. Examples of suitable heteroatoms are N, O, S, B, P, Si, Al, preferred heteroatoms in this context being N, S and/or O, Suitable substituents to be mentioned in this respect are, inter alia, —OH, a nitro group, an amino group or an alkyl or alkoxy group.

Accordingly, the present invention also relates to a method as described above, wherein the at least bidentate organic compound used is an aromatic di-, tri- and/or tetracarboxylic acid.

Particularly preferred at least bidentate organic compounds used in the method according to the invention are acetylenedicarboxylic acid (ADC), benzenedicarboxylic acids, naphthalenedicarboxylic acids, biphenyldicarboxylic acids such as e.g. 4,4'-biphenyldicarboxylic acid (BPDC), bipyridinedicarboxylic acids such as e.g. 2,2'-bipyridinedicarboxylic acids such as e.g. 2,2'-bipyridine-5,5'-dicarboxylic acid, benzenetricarboxylic acids such as e.g. 1,2,3-benzenetricarboxylic acid or 1,3,5-benzenetricarboxylic acid (BTC), adamantanetetracarboxylic acid (ATC), adamantanedibenzoate (ADB) benzenetribenzoate (BTB), methanetetrabenzoate (MTB), adamantanetetrabenzoate or dihydroxyterephthalic acids such as e.g. 2,5-dihydroxyterephthalic acid (DHBDC).

Most especially preferred within the scope of the present invention is the use of, inter alia, terephthalic acid, 2,5-dihydroxyterephthalic acid, 1,2,3-benzenetricarboxylic acid, 1,3,5-benzenetricarboxylic acid or 2,2'-bipyridine-5,5'-dicarboxylic acid.

According to an example of a preferred embodiment, the at least bidentate organic compound used is 1,3,5-benzenetricarboxylic acid. In the case where at least one solvent is used, the preferred solvent used is, for example, methanol or ethanol or methanol and ethanol. Ethanol is particularly preferred.

According to an example of a further preferred embodiment, the at least bidentate organic compound used is 1,2,3-benzenetricarboxylic acid. In the case where at least one solvent is used, the preferred solvent used is, for example, methanol or ethanol or methanol and ethanol. Methanol is particularly preferred.

According to an example of a further preferred embodiment, the at least bidentate organic compound used is terephthalic acid. In the case where at least one solvent is used, the preferred solvent used is, for example, dimethylformamide or diethylformamide or dimethylformamide and diethylformamide. Diethylformamide is particularly preferred.

According to an example of a further preferred embodiment, the at least bidentate organic compound used is dihydroxyterephthalic acid. In the case where at least one solvent is used, the preferred solvent used is, for example, dimethylformamide or diethylformamide or dimethylformamide and diethylformamide. Diethylformamide is particularly preferred.

According to an example of a further preferred embodiment, the at least bidentate organic compound used is naphthalene-2,6-dicarboxylic acid. In the case where at least one solvent is used, the preferred solvent used is, for example, methanol or ethanol or methanol and ethanol. Methanol is particularly preferred.

The at least one at least bidentate compound is employed in a concentration which generally is in the range of from 0.1 to 30 wt %, preferably in the range of from 0.5 to 20 wt % and particularly preferably in the range of from 2 to 10 wt %, in each case based on the total weight of the reaction system minus the weight of the anode and the cathode. Accordingly, the term "concentration" in this case comprises both the amount dissolved in the reaction system and any amount suspended in the reaction system, of the at least one at least bidentate compound.

According to a preferred embodiment of the method according to the invention, the at least one at least bidentate compound is added continuously and/or discontinuously as a function of the progress of the electrolysis and in particular as a function of the decomposition of the anode or liberation of the at least one metal ion and/or as a function of the formation of the metal-organic framework material.

The following combinations of metal from which the at least one metal cation is provided by anodic oxidation, at least bidentate compound and solvent are preferred, for example, within the scope of the present invention:
Zn/BDC/DEF; Zn/DHBDC/DEF; Zn/$H_2$BDC/DMF; Zn/BDC/DMF, MeOH; Zn/$H_2$BDC/DMF; Zn/4,4'-BP-2,2'-DC/DEF; Zn/2,6-NDC/DEF; Zn/$H_3$BTB/$H_2$O, DMF, EtOH; Zn/$H_2$BDC/DMSO; Zn/1,4-NDC/DMF; ZN/$H_3$BTB/DMF, EtOH; Zn/$H_2$BDC/DMF, AN; Zn/$H_2$BDC/DMSO; Zn/$H_2$BDC/DMSO, MeOH; Zn/$H_2$BDC/DMSO, n-propanol; Zn/$H_2$BDC/NMP; Zn/m-BDC/DMF, AN; Zn/1,4-NDC/DMF, EtOH; Zn/$H_2$N-BDC/DEF, EtOH; Zn/1,4-NDC/DEF; Zn/2,6-NDC/DEF; Zn/PDC/DEF;
Cu/BDC/DEF; Cu/1,3,5-BTC/EtOH; Cu/1,2,3-BTC/MeOH; Cu/$H_3$BTB/$H_2$O, DMF, EtOH; Cu/$H_2$BDC(OH)$_2$/DMF; Cu/thiophenedicarboxylic acid/DEF; Cu/thiophenedicarboxylic acid/DMF; Cu/thiophenedicarboxylic acid/MeOH: Cu/malonic acid/DMF; Cu/glutaric acid/DMF; Cu/tartaric acid/DMF;
Fe/$H_2$BDC/DMF; Fe/$H_3$BDC/DMF; Fe/BTC/DMF; Fe/BDC/DMF, EtOH; Fe/BPDC/DMF, n-propanol; Fe/m-BDC/pyridine; Fe/m-BDC/DMF, pyridine;
Co/BDC/MeOH; Co/$H_2$BDC/NMP; Co/$H_2$BDC/DMF
Mg/BDC/DEF; Mg/BDC(OH)$_2$/DMF;
Pb/$H_2$BDC/DMF, EtOH;

The meaning of the abbreviations is as follows:
BDC benzenedicarboxylic acid
m-BDC m-benzenedicarboxylic acid H$_2$BDC dihydroterephthalic acid
H$_2$N-BDC aminoterephthalic acid
4,4'-BP-2,2'-DC 4,4'-biphenyl-2,2'-dicarboxylic acid
4,4'-BPDC 4,4'-biphenyldicarboxylic acid
H$_3$BTB benzene tribenzoate
1,3,5-BTC 1,3,5-benzenetricarboxylic acid
1,2,3-BTC 1,2,3-benzenetricarboxylic acid
DHBDC 2,5-dihydroxyterephthalic acid
2,6-NDC 2,6-naphthalenedicarboxylic acid
1,4-NDC 1,4-naphthalenedicarboxylic acid
PDC pyrenedicarboxylic acid According to an especially preferred embodiment of the method according to the invention, the reaction medium comprises at least one suitable conducting salt. Depending on the at least one at least bidentate compound used and/or the if appropriate used solvent it is also possible, in the method according to the invention, to carry out the preparation of the metal-organic framework material without an additional conducting salt.

With respect to the conducting salts which can be used in the method according to the invention there are essentially no restrictions. Preferential use is made, for example, of salts of mineral acids, sulfonic acids, phosphonic acids, boronic acids, alkoxysulfonic acids or carboxylic acids or of other acidic compounds such as e.g. sulfonic acid amides or imides.

Possible anionic components of the at least one conducting salt accordingly are, inter alia, sulfate, nitrate, nitrite, sulfite, disulfite, phosphate, hydrogen phosphate, dihydrogen phosphate, diphosphate, triphosphate, phosphite, chloride, chlorate, bromide, bromate, iodide, iodate, carbonate or hydrogen carbonate.

To be mentioned as the cation component of the conducting salts that can be used according to the invention are, inter alia, alkali metal ions such as Li$^+$, Na$^+$, K$^+$ or Rb$^+$, alkaline earth metal ions such as Mg$^{2+}$, Ca$^{2+}$, Sr$^{2+}$ or Ba$^{2+}$, ammonium ions or phosphonium ions.

To be mentioned with respect to the ammonium ions are quaternary ammonium ions and protonated mono-, di- and triamines.

The examples for quaternary ammonium ions preferentially used according to the invention include, inter alia
- symmetric ammonium ions such as tetraalkylammonium preferably containing C$_1$-C$_4$-alkyl, for example methyl, ethyl, n-propyl, isopropyl, n-butyl, isobutyl, t-butyl, such as tetramethylammonium, tetraethylammonium, tetrapropylammonium, tetrabutylammonium or
- nonsymmetric ammonium ions such as nonsymmetric tetraalkylammonium preferably containing C$_1$-C$_4$-alkyl, for example methyl, ethyl, n-propyl, isopropyl, n-butyl, isobutyl, t-butyl, such as e.g. methyltributylammonium or
- ammonium ions containing at least one aryl such as e.g. phenyl or naphthyl or at least one alkaryl such as e.g. benzyl or at least one aralkyl and at least one alkyl, preferably C$_1$-C$_4$-alkyl, for example methyl, ethyl, n-propyl, isopropyl, n-butyl, isobutyl, t-butyl, such as aryltrialkyl such as benzyltrimethylammonium or benzyltriethylammonium.

According to a particularly preferred embodiment, use is made in the method according to the invention of at least one conducting salt which comprises, as at least one cationic component, a methyltributylammonium ion.

According to a particularly preferred embodiment, the method according to the invention makes use of methyltributylammonium methyl sulfate as the conducting salt.

Conducting salts which can be used in the method according to the invention are also ionic liquids such as e.g. methylethylimidazolium chloride or methylbutylimidazolium chloride.

According to a likewise preferred embodiment, the method according to the invention employs methane sulfonate as the conducting salt.

The cation component of the at least one conducting salt can, according to the invention, take the form of protonated or quaternary heterocyclic compounds such as e.g. the imidazolium ion.

Within the scope of an embodiment, preferred inter alia, of the method according to the invention it is possible, via the cationic and/or anionic component of the at least one conducting salt, to introduce compounds into the reaction medium which are employed for establishing the metal-organic framework material. These compounds are those which affect the formation of the structure of the metal-organic framework material but which are not present in the resulting framework material, as well as those that are present in the resulting framework material. In particular it is possible, in the method according to the invention, to introduce, via at least one conducting salt, at least one compound which is present in the resulting metal-organic framework material.

Preference is given in this respect, for example, inter alia, to tetraalkylammonium carboxylate such as a monotetraalkylammonium salt of 1,3,5-benzenetricarboxylic acid. Within the scope of this embodiment it is preferred, inter alia, for 1,3,5-benzenetricarboxylic acid to be used together with tetraalkylammoniumhydroxide in methanol as the solvent. This way of managing the process is claimed to have the advantage, inter alia, that tetraalkylammoniumhydroxide is used as an aqueous solution, as a rule, and water thus automatically becomes an essential component of the reaction medium.

Accordingly, the present invention also describes a method as described above wherein at least one compound required for establishing the metal-organic framework material, preferably at least one compound present in the metal-organic framework material to be prepared is introduced, at least in part, via at least one conducting salt into the reaction system.

Within the scope of an embodiment of the method according to the invention it is therefore possible for the metal ion, in addition to the at least one anode as the metal ion source, to be introduced via the cationic component of the at least one conducting salt into the reaction medium. Likewise it is possible to introduce into the reaction medium, via the cationic component of the at least one conducting salt, at least one metal ion which differs from the at least one metal ion introduced via anodic oxidation, where this difference can relate to the valency of the cation and/or the type of the metal.

Likewise it is possible, within the scope of the method according to the invention, for salts to be used as conducting salts whose anion component or anion components represents a compound which is used to establish the metal-organic framework material. In particular it is therefore possible to use conducting salts whose anion components for example represent the monocarboxylate or dicarboxylate or tricarboxylate or tetracarboxylate or monosulfonate or disulfonate or trisulfonate or tetrasulfonate, preferably a dicarboxylate or tricarboxylate or tetracarboxylate and more preferably the dicarboxylate or tricarboxylate or tetracarboxylate of the preferentially employed aromatic di-, tri- or tetracarboxylic acid.

Accordingly, the present invention also describes a method as described above, wherein the at least one conducting salt comprises a salt of the at least one at least bidentate compound.

The present invention further also describes the method as described above wherein the at least one conducting salt comprises as the cation component a quaternary ammonium ion and as the anion component a carboxylate of the at least one at least bidentate compound.

The concentration of the at least one conducting salt within the scope of the method according to the invention is generally in the range of from 0.01 to 10 wt %, preferably in the range of from 0.05 to 5 wt % and particularly preferably in the range of from 0.1 to 3 wt %, in each case based on the sum of the weights of all the conducting salts present in the reaction system and further based on the total weight of the reaction system without including the anodes and cathodes.

A major advantage of the present method according to the invention should therefore be seen in the fact that none of the abovementioned critical anions such as halides or nitrate, which in the conventional method are introduced via the at least one metal salt into the reaction medium, is introduced in stoichiometric quantities but only, if at all, in substoichiometric quantities, i.e. essentially in catalytic quantities, via the at least one conducting salt.

If the method is implemented in batch mode, the general procedure is first to provide the reaction medium with the starting materials, then to apply current, followed by pumped circulation.

If the method is implemented in continuous mode, the general procedure is to divert a substream from the reaction medium, to isolate the crystalline, porous, metal-organic framework material present in the substream, and to recycle the mother liquor.

A further advantage offered by the method according to the invention compared with the prior art methods using metal salts as starting materials in the preparation of the porous, metal-organic framework materials is the fact that according to the invention a higher solids content in the reaction medium can be achieved in each synthesis batch, as the solids content is not limited by the amount of starting material salt used. This is because the metal cation can be replenished ad libertum via the anode.

The term "solids content" as used within the scope of the present invention refers to the amount of separated solid after the reaction, based on the total amount of the reaction batch.

In contrast to the prior art preparation method, in which it is necessary to dissolve not only the ligand, but also the metal salt, the at least one solvent is completely available, within the scope of the method according to the invention, for dissolving and/or suspending, preferably for dissolving the ligand.

This applies, in particular, in a continuous-mode variant of the method according to the invention, in which the anode is fed forward to the extent that it is ablated by anodic oxidation. This is effected as described above, for example within the context of a pencil sharpener cell. In analogy to the anode being fed forward, the at least one at least bidentate compound is replenished. In the process it is then possible for the suspension formed, which comprises the metal-organic framework material, to be discharged continuously.

This replenishment of the metal cation via feed-forward of the anode, an experimentally simple procedure, considerably increases the economic efficiency of the method of preparing the porous, metal-organic framework materials.

Generally, the solids content is at least 0.5 wt %, particularly preferably in the range of from 0.5 to 50 wt %.

Accordingly, the present invention also relates to a method as described above wherein the solids content is in the range of from 0.5 to 50 wt %.

According to an especially preferred embodiment, the method according to the invention is implemented in such a way as to prevent the redeposition on the cathode of the metal ion liberated by anodic oxidation.

Said redeposition is preferentially prevented, for example, according to the invention, by employing a cathode which, in a given reaction medium, has a suitable hydrogen overpotential. Such cathodes are, for example, the abovementioned graphite, copper, zinc, tin, manganese, silver, gold, platinum cathodes or cathodes comprising alloys such as steels, bronzes or brass.

The redeposition is further prevented, according to the invention, for example, by employing in the reaction medium an electrolyte which promotes the cathodic formation of hydrogen. In this respect, an electrolyte is preferred, inter alia, which comprises at least one protic solvent. Preferred examples of such solvents have been listed above, alcohols being particularly preferred, methanol and ethanol being especially preferred.

The redeposition is further prevented, according to the invention, for example, by employing a reaction medium containing at least one compound which leads to cathodic depolarization. A compound leading to cathodic depolarization is to be understood, within the scope of the present invention, as any compound which under given reaction conditions is reduced at the cathode.

Preferred cathodic depolarizers, inter alia, are compounds which are hydrodimerized at the cathode. Particularly preferred in this context, for example, are acrylonitrile, acrylic acid esters and maleic acid esters such as e.g., more preferably, dimethyl maleate.

More preferred as cathodic depolarizers are, inter alia, compounds comprising at least one carbonyl group which is reduced at the cathode. Examples of such compounds comprising carbonyl groups are e.g. esters such as dialkylphthalates and ketones such as acetone.

Preferred cathodic depolarizers are, inter alia, compounds having at least one nitrogen-oxygen bond, a nitrogen-nitrogen bond and/or a nitrogen-carbon bond, which are reduced at the cathode. Examples of such compounds are e.g. compounds have a nitro group, an azo group, an azoxy group, oximes, pyridines, imines, nitriles and/or cyanates.

Within the scope of the method according to the invention it is further possible to combine at least two of the said measures for preventing the cathodic redeposition. It is possible, for example, to use both an electrolyte which promotes the cathodic formation of hydrogen and to use an electrode having a suitable hydrogen overpotential. Equally it is possible to use both an electrolyte which promotes the cathodic formation of hydrogen and to add at least one compound which leads to cathodic depolarization. Equally it is possible both to add at least one compound which leads to cathodic depolarization and to employ a cathode having a suitable hydrogen overpotential. Furthermore it is possible both to use an electrolyte which promotes the cathodic formation of hydrogen and to employ an electrode having a suitable hydrogen overpotential and also to add at least one compound which leads to cathodic depolarization.

Accordingly, the present invention also relates to a method as described above wherein the cathodic redeposition of the at least one metal ion is at least partially prevented by at least one of the following measures:

(i) the use of an electrolyte which promotes the cathodic formation of hydrogen;
(ii) the addition of at least one compound leading to cathodic depolarization;
(iii) the use of a cathode having a suitable hydrogen overpotential.

Likewise, the present invention therefore also relates to a method as described above wherein the electrolyte according to (i) comprises at least one protic solvent, particularly an alcohol, more preferably methanol and/or ethanol.

Likewise, the present invention therefore also relates to a method as described above, wherein the cathodic depolarization is a hydrodimerization, particularly a hydrodimerization of a maleic acid diester, more preferably of dimethyl maleate.

Particularly preferably, the present invention describes a method as described above wherein, in order to prevent the redeposition, both at least one protic solvent, preferably an alcohol, more preferably methanol or ethanol or a mixture of methanol and ethanol, and at least one compound cathodically capable of hydrodimerization, preferably a maleic acid diester, more preferably a dimethyl maleate, are used.

According to an especially preferred embodiment, the method according to the invention is operated in recycle mode. This "electrolytic cycle" is to be understood, within the scope of the present invention, to mean any process mode in which at least part of the reaction system contained in the electrolytic cell is removed from the electrolytic cell, optionally subjected to at least one intermediate treatment step such as e.g. at least one thermal treatment or addition and/or separation of at least one component of the discharged stream and is returned to the electrolytic cell. Particularly preferably, such an electrolytic cycle is carried out, within the scope of the present invention, in combination with a plate stack cell, a tubular cell or a pencil sharpener cell.

After the preparation has been carried out, the generally crystalline framework material is present in the mother liquor in the form of the primary crystals.

After the metal-organic framework material has been prepared, the framework material solid is separated from its mother liquor. This separation process can, in principle, be effected via any suitable technique. Preferably, separation of the framework material solid is achieved via solid-liquid separation, centrifugation, extraction, filtration, membrane filtration, cross-flow filtration, diafiltration, ultrafiltration, flocculation with the use of flocculation aids such as e.g. nonionic, cationic and/or anionic aids, pH shift by adding additives such as e.g. salts, acids or bases, flotation, spray-drying, spray granulation or evaporation of the mother liquor at elevated temperatures or reduced pressure and concentration of the solid.

The separation can be followed by at least one additional washing step, at least one additional drying step and/or at least one additional calcining step.

If the method according to the invention comprises at least one subsequent washing step, washing is preferably effected using at least one solvent employed in the synthesis.

If the method according to the invention, if appropriate after at least one washing step, comprises at least one subsequent drying step, the framework material solid is dried at temperatures generally in the range of from 20 to 120° C., preferably in the range of from 40 to 100° C. and particularly preferably in the range of from 56 to 60° C.

Also preferred is vacuum drying, generally allowing temperatures to be chosen such that the at least one wash medium is removed at least partially, preferably essentially in its entirety, from the crystalline, porous, metal-organic framework material while at the same time the framework structure is not destroyed.

The drying time is generally in the range of from 0.1 to 15 h, preferably in the range of from 0.2 to 5 h and especially preferably in the range of from 0.5 to 1 h.

The if appropriate at least one washing step and if appropriate at least one drying step can be followed by at least one calcining step, in which the temperatures chosen are preferably such that the structure of the framework material is not destroyed.

For example it is possible, particularly by washing and/or drying and/or calcining, for at least one template compound If appropriate used for the inventive electrochemical preparation of the framework material to be removed at least in part and preferably essentially quantitatively.

As well as to the electrochemical preparation method, the present invention also relates to the porous, metal-organic framework material per se prepared via the method as described above.

The crystalline, porous, metal-organic framework material is generally produced as a fine powder, the crystals being of a size in the range of from 0.1 to 100 μm as determined via SEM (Scanning Electron Microscopy).

The pore sizes of the porous, metal-organic framework materials prepared according to the invention can be adjusted over wide ranges via the type and number of the at least bidentate organic compound and/or type and, if appropriate, the oxidation state of the at least one metal ion.

Accordingly it is possible for the framework material prepared according to the invention to contain micropores or mesopores or macropores or micro- and mesopores or micro- and macropores or meso- and macropores or micro- and meso- and macropores. Especially preferably, the framework materials prepared according to the invention comprise micropores or mesopores or micro- and mesopores. The term "micropores" as used within the scope of the present invention refers to pores having a diameter of up to 2 nm. The term "mesopores" as used within the scope of the present invention refers to pores having a diameter of more than 2 nm up to 50 nm. These definitions correspond to the definitions as can be found in Pure Appl. Chem. 45 (1976), p. 71 et seq., particularly p. 79. The presence of micro- and/or mesopores can be determined via nitrogen adsorption measurements at 77 K in accordance with DIN 66131 and DIN 66135 and DIN 66134.

Accordingly, the present invention also describes a framework material as described above which comprises micropores or mesopores or both micro- and mesopores.

The specific surface area of the crystalline, porous, metal-organic framework materials according to the invention as determined via DIN 66135 is generally at least 5 $m^2/g$, especially more than 5 $m^2/g$, more preferably at least 10 $m^2/g$ especially more than 10 $m^2/g$, more preferably at least 50 $m^2/g$, especially more than 50 $m^2/g$, more preferably at least 100 $m^2/g$, especially more than 100 $m^2/g$, more preferably at least 250 $m^2/g$, especially more than 250 $m^2/g$, more preferably at least 500 $m^2/g$, especially more than 500 $m^2/g$, and the specific surface area can be up to more than 1000 $m^2/g$, such as e.g. more than 2000 $m^2/g$, further e.g. more than 3000 $m^2/g$ and especially e.g. more than 4000 $m^2/g$.

The term "specific surface area" as used within the scope of the present invention refers to the surface area as determined in accordance with the Langmuir model according to DIN 66135 at 77 K.

Accordingly, the present invention also relates to a metal-organic framework material as described above, which has a specific surface area, determined in accordance with DIN 66135, of greater than or equal to 250 $m^2/g$.

According to a further embodiment of the method according to the invention, the porous, metal-organic framework material separated from the mother liquor is formed to produce one or more shaped articles.

The possible geometries of these shaped articles are essentially not subject to any restrictions. The examples to be mentioned include, inter alia, pellets such as e.g. disk-shaped pellets, tablets, spheres, granules, extrudates such as e.g. strands, honeycombs, grids or hollow bodies.

Fabrication of these shaped articles is possible, in principle, via any suitable procedure. Within the scope of the present invention, the following process modes are preferred, inter alia:

kneading of the framework material on its own or together with at least one binder and/or at least one pasting agent and/or at least one template compound to obtain a mixture;

shaping the resulting mixture by means of at least one suitable method such as e.g. extrusion;

optional washing and/or drying and/or calcining of the extrudate;

optional conditioning.

Applying the framework material to at least one support material which may or may not be porous. The material obtained can then be further processed in accordance with the above-described method to produce a shaped article.

Applying the framework material to at least one substrate which is if appropriate porous.

Kneading and shaping can be effected via any suitable technique, such as described, e.g. in Ullmanns Enzyklopädie der Technischen Chemie, [Ullmann's Encyclopedia of Technical Chemistry], 4th Edition, Vol. 2, p. 313 et seq. (1972), which is incorporated by reference.

Preferentially, for example, kneading and/or shaping can be effected by means of a piston press, roll press in the presence or absence of at least one binder material, compounding, pelleting, tableting, extrusion, coextrusion, foaming, spinning, coating, granulation, preferably spray granulation, spraying, spray-drying or a combination of two or more of these methods.

Especially, the method according to the invention involves the preparation of pellets and/or tablets.

Said kneading and/or shaping can be effected at elevated temperatures such as e.g. in the range of from room temperature to 300° C. and/or at elevated pressure such as e.g. in the range of from atmospheric pressure up to a few hundred bar and/or in a protective gas atmosphere such as e.g. in the presence of at least one noble gas, nitrogen or a mixture of two or more of these.

Said kneading and/or shaping is effected, according to a further embodiment of the method according to the invention, with the addition of at least one binder, where the binder used can in principle be any chemical compound which ensures that the viscosity of the composition to be kneaded and/or shaped is as desired for kneading and/or shaping. Accordingly, binders for the purpose of the present invention can be either viscosity-raising or viscosity-lowering compounds.

Examples of binders which are preferred inter alia include aluminum oxide or binders which comprise aluminum oxide, as described e.g. in WO 94/29408, silicon dioxide, as described e.g. in EP 0 592 050 A1, mixtures of silicon dioxide and aluminum oxide, as described e.g. in WO 94/13584, clay minerals as described e.g. in JP 03-037156 A, e.g. montmorillonite, kaolin, bentonite, hallosite, dickite, nacrite and anauxite, alkoxysilanes as described e.g. in EP 0 102 544 B1, for example tetraalkoxysilanes such as e.g. tetramethoxysilane, tetraethoxysilane, tetrapropoxysilane, tetrabutoxysilane, or for example trialkoxysilanes such as e.g. trimethoxysilane, triethoxysilane, tripropoxysilane, tributoxysilane, alkoxytitanates, for example tetraalkoxytitanates such as e.g. tetramethoxytitanate, tetraethoxytitanate, tetrapropoxytitanate, tetrabutoxytitanate or for example trialkoxytitanate such as e.g. trimethoxytitanate, triethoxytitanate, tripropoxytitanate, tributoxytitanate, alkoxyzirkonates, for example tetraalkoxyzirconates such as e.g. tetramethoxyzirconate, tetraethoxyzirconate, tetrapropoxyzirconate, tetrabutoxyzirconate, or for example trialkoxyzirconate such as e.g. trimethoxyzirconate, triethoxyzirconate, tripropoxyzirconate, tributoxyzirconate, silica sols, amphiphilic substances and/or graphites. Graphite is especially preferred.

Examples of a viscosity-raising compound which can be used, if appropriate in addition to the abovementioned compounds, include an organic compound and/or a hydrophilic polymer such as e.g. cellulose or a cellulose derivative such as e.g. methyl cellulose and/or a polyacrylate and/or a polymethacrylate and/or a poly(vinyl alcohol) and/or a poly(vinylpyrrolidone) and/or a polyisobutene and/or a polytetrahydrofuran.

The pasting agent used can, inter alia, be preferably water or at least one alcohol such as e.g. a monoalcohol having from 1 to 4 C atoms such as e.g. methanol, ethanol, n-propanol, isopropanol, 1-butanol, 2-butanol, 2-methyl-1-propanol or 2-methyl-2-propanol or a mixture of water and at least one of these alcohols or a polyhydric alcohol such as e.g. a glycol, preferably a water-miscible polyhydric alcohol, on its own or as a mixture with water and/or at least one of the said monohydric alcohols.

Further additives which can be used for kneading and/or shaping include, inter alia, amines or amine derivatives such as e.g. tetraalkylammonium compounds or aminoalcohols and carbonate-comprising compounds such as e.g. calcium carbonate. Such further additives are described, for example, in EP 0 389 041 A1, EP 0 200 260 A1 or WO 95/19222, which are incorporated by reference.

The sequence of additives such as template compound, binder, pasting agent, viscosity-raising substance during shaping and kneading is not critical, in principle.

According to a further preferred embodiment of the method according to the invention, the shaped article obtained via kneading and/or shaping is subjected to at least one drying operation which in general is carried out at a temperature in the range of from 25 to 300° C., preferably in the range of from 50 to 300° C. and particularly preferably in the range of from 100 to 300° C. Likewise it is possible for drying to be carried out at a reduced pressure or under a protective-gas atmosphere or by spray drying.

According to a particularly preferred embodiment, this drying operation involves the at least partial removal, of at least one compound added as an additive, from the shaped article.

According to a further embodiment of the method according to the invention, the framework material is applied to at least one material which is if appropriate porous, the use of a porous substrate being preferred.

Especially preferably, said application is effected via impregnation with a liquid, steeping in a liquid, spraying, deposition from liquid phase, deposition from the gas phase (vapor deposition), precipitation, coprecipitation, coating.

The substrate used, which is if appropriate porous, is preferably aluminum oxide, silica gel, silicates, diatomaeous earths, kaolin, magnesium oxide, activated carbon, titanium dioxide and/or zeolites.

If, for example, nonporous substrates are used, it is possible, according to a further embodiment of the method according to the invention, to apply the porous, metal-organic framework material to a nonporous shaped article and thus to produce shell structures as are known from egg shell catalysts.

Accordingly, the present invention also describes a shaped article comprising at least one porous, metal-organic framework material as described above and/or a framework material obtainable via a method as described above.

Obviously it is also possible, within the scope of the method according to the invention, for at least one suitable pore former to be added during the fabrication of the shaped articles. The pore formers used in the method according to the invention can include all those compounds which provide the finished shaped article with a specific pore size, a specific pore size distribution and/or specific pore volumes. Preferred pore formers used in the method according to the invention include, inter alia, polymeric vinyl compounds such as e.g. polystyrene, polyacrylates, polymethacrylates, polyolefins, polyamides and polyesters. Most especially preferred as pore formers are e.g. compounds which can be at least partially, preferably essentially entirely removed at the calcining temperatures of the method according to the invention. One example to be mentioned in this context is malonic acid.

The porous, metal-organic framework materials prepared according to the invention and/or the shaped articles fabricated according to the invention and comprising at least one porous, metal-organic framework material prepared according to the invention can, in principle, be used in any conceivable manner. Particularly preferred is their use as pigments or as sensors, as electrical conductors or as ion conductors.

Especially preferred in this context are applications which allow the high specific surface area of the framework materials to be utilized.

Especially preferred is the use of the framework materials, optionally present in a shaped article, for the purification of gases and/or liquids, as catalysts, for absorbing and/or storing and/or dispensing liquids and/or gases.

Accordingly, the present invention also relates to the use of a porous, metal-organic framework material as described above or of a porous, metal-organic framework material obtainable via the above-described method for purifying at least one liquid and/or at least one gas or as a storage medium for at least one liquid and/or at least one gas.

Particularly preferred is the use for storing at least one gas, the gases to be mentioned including, in particular, hydrogen, $C_1$-$C_4$ hydrocarbons such as e.g. methane, ethane, propane, butane and especially methane.

A further especially preferred use of the porous, metal-organic framework material according to the invention is the storage of at least one gas and/or at least one liquid, particularly preferably at least one gas, especially preferably the storage of methane or hydrogen, in a vessel at a pressure in the range of from 1 to 750 bar, for example preferably in the range of from 1 to 150 bar, more preferably in the range of from 1 to 80 bar, more preferably in the range of from 45 to 80 bar and particularly preferably in the range of from 50 to 80 or, for example, preferably in the range of from 45 to 750 bar, more preferably in the range of from 45 to 150 bar, more preferably in the range of from 50 to 150 bar and particularly preferably in the range of from 50 to 80 bar.

Such vessels can, for example, be employed as part of a fuel cell as can be used, for example, for operating stationary, mobile and/or portable applications. Such applications include, for example, power stations, motor vehicles, trucks, buses, cableless applications, mobile telephones or laptops.

At the same time, said vessel can in principle be of any suitable geometry. Given the low pressures possible according to the invention, even those vessels are preferentially feasible which deviate from standard cylindrical geometry and can be variably adapted to particular requirements, for example the specific spatial stipulations in motor vehicle manufacture. This allows the vessels which can be of variable design to be fitted into not otherwise utilizable cavities of a motor vehicle, thus gaining valuable stowage space and useful space.

The following examples and figures are intended to illustrate the present invention.

In detail in the figures:

FIG. 5 shows a comparison of the prior art wherein

Figure 1:
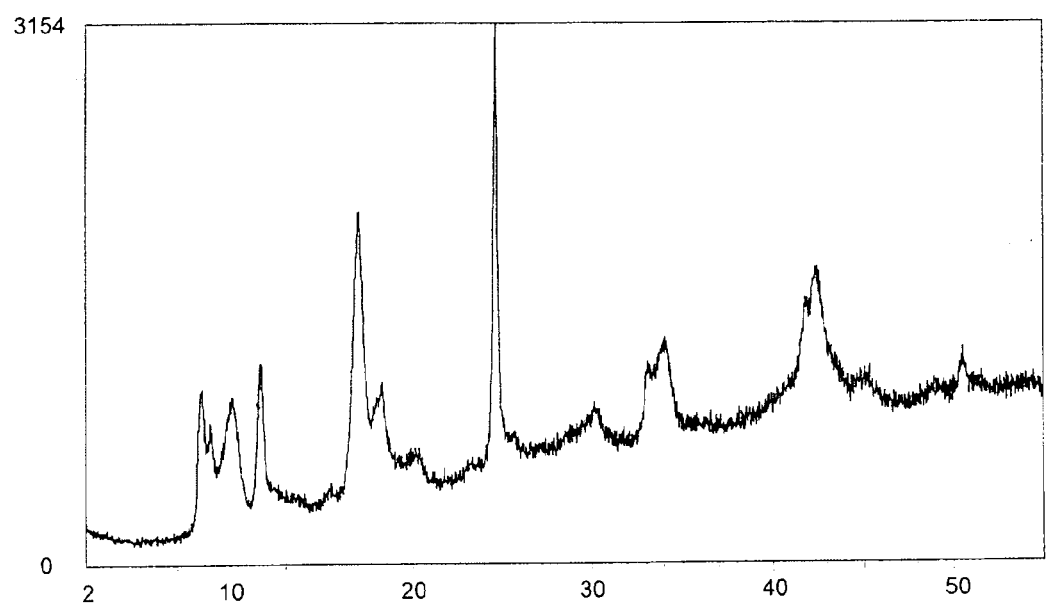
FIG. 1 shows the X-ray diffractograph of Cu-MOF according to example 2. The abscissa represents the 2Θ scale, the Lin (counts) being plotted on the ordinate.
Figure 2:
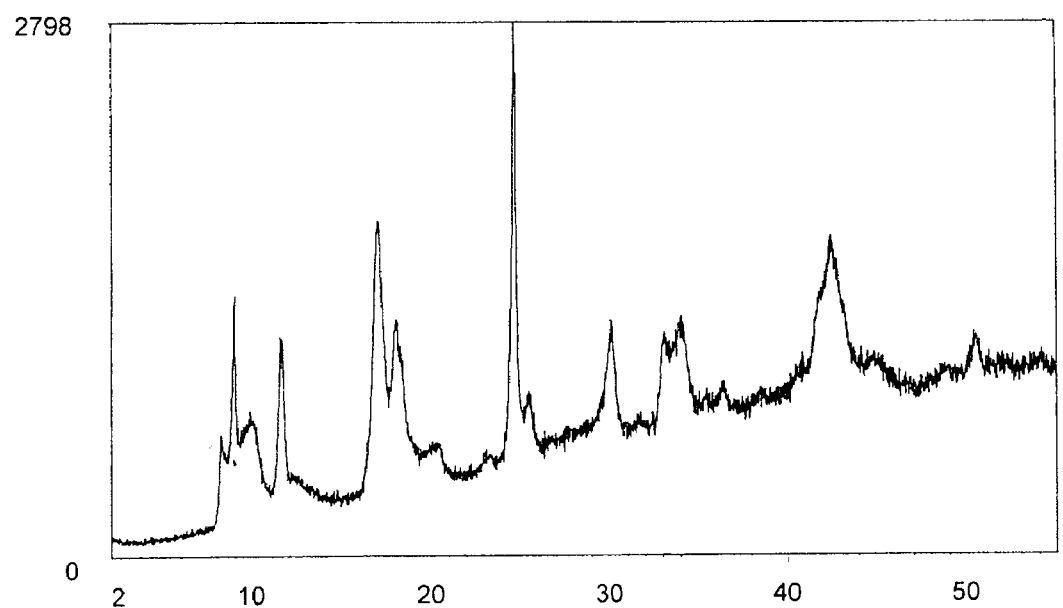
FIG. 2 shows the X-ray diffractograph of Cu-MOF according to example 3. The abscissa represents the 2Θ scale, the Lin (counts) being plotted on the ordinate.
Figure 3:
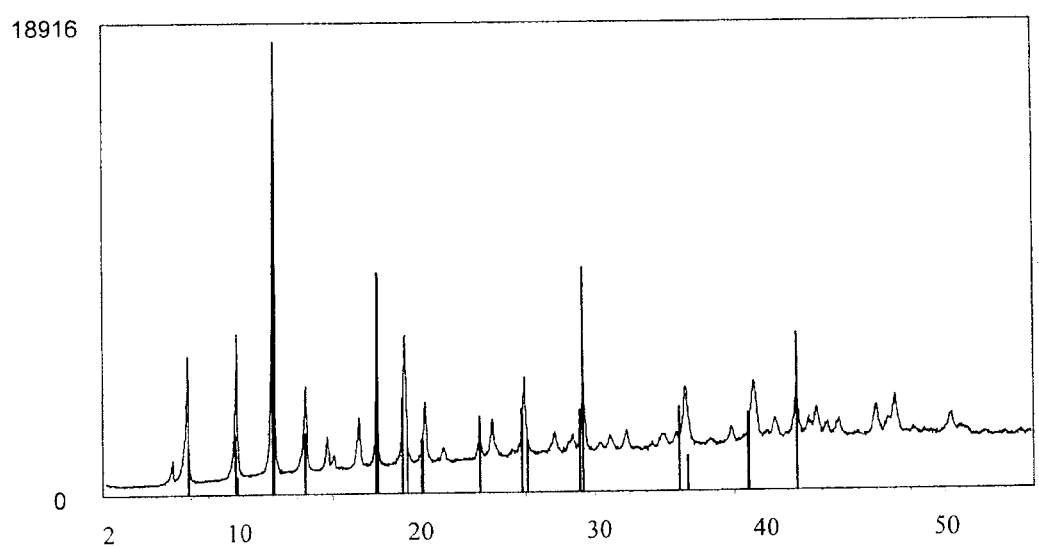
FIG. 3 shows the X-ray diffractograph of Cu-MOF according to example 5. The abscissa represents the 2Θ scale, the Lin (counts) being plotted on the ordinate.
Figure 4:
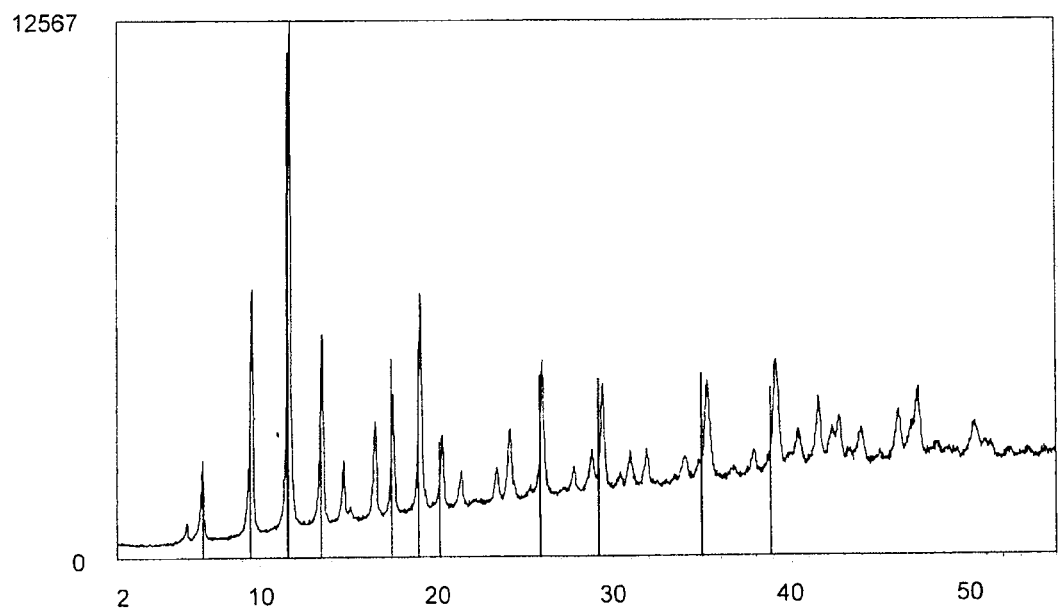
FIG. 4 shows the X-ray diffractograph of Cu-MOF according to example 9. The abscissa represents the 2Θ scale, the Lin (counts) being plotted on the ordinate.

| — | MOF-ST |
|---|---|
| -·-·- | EMOF-2 |
| ---- | EMOF-1 |
| ········ | Tenorite | and the MOF-ST sample prepared according to the prior art has an additional maximum at about 8.9798 keV.

EXAMPLES

Example 1

Preparation of a Zn-MOF in a Gap Cell

In a $N_2$-blanketed 100 ml glass cylinder equipped with heating jacket, magnetic stirrer, internal thermometer and fitted with two plan parallel zinc electrodes (thickness about 2 mm; facing surface areas each 7.1 cm$^2$) spaced 1 cm apart, a mixture of 47.5 g of diethylformamide, 4.0 g of terephthalic acid, 5.0 g of dimethyl maleate and 1.0 g of methyltributylammonium methyl sulfate (MTBS) was electrolyzed at 53-57° C. At a constant amperage of 0.2 A, the cell voltage gradually rose during the electrolysis from 15.8 V to 19.2 V over a period of 3 h. The end of the electrolysis could be discerned from a further distinctive voltage rise to above 30 V. It was terminated after 4 h. A dense, white suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 4.8 g (surface area according to Langmuir in accordance with DIN 66135: 350 m$^2$/g).

Example 2

Preparation of a Cu-MOF in a Gap Cell

In a $N_2$-blanketed 100 ml glass cylinder equipped with heating jacket, magnetic stirrer, internal thermometer and fitted with two plan parallel copper electrodes (thickness about 2 mm; facing surface areas each 9.9 cm$^2$) spaced 1 cm apart, a mixture of 47.5 g of diethylformamide, 4.0 g of terephthalic acid, 5.0 g of dimethyl maleate and 1.0 g of methyltributylammonium methyl sulfate (MTBS) was electrolyzed at 21° C. At a constant amperage of 0.2 A, the cell voltage rose during the electrolysis from 23.1 V to 33.8 V. The electrolysis was terminated after 4 h. A dense, turquoise colored suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 5.1 g (surface area according to Langmuir in accordance with DIN 66135: 256 $m^2/g$).

Example 3

Preparation of a Cu-MOF in a Gap Cell

In a $N_2$-blanketed 100 ml glass cylinder equipped with heating jacket, magnetic stirrer, internal thermometer and fitted with two plan parallel copper electrodes (thickness about 2 mm; facing surface areas each 9.9 $cm^2$) spaced 1 cm apart, a mixture of 47.5 g of diethylformamide, 4.0 g of terephthalic acid, 5.0 g of dimethyl maleate and 1.0 g of methyltributylammonium methyl sulfate (MTBS) was electrolyzed at 58-61° C. At a constant amperage of 0.2 A, the cell voltage rose during the electrolysis from 13.8 V to 18.0 V. The electrolysis was terminated after 4 h. A dense, turquoise colored suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 4.5 g (surface area according to Langmuir in accordance with DIN 66135: 477 $m^2/g$).

Example 4

Preparation of a Mg-MOF in a Gap Cell

In a $N_2$-blanketed 100 ml glass cylinder equipped with heating jacket, magnetic stirrer, internal thermometer and fitted with two plan parallel electrodes (thickness about 2 mm; facing surface areas each 9.9 $cm^2$), the anode being made of magnesium and the cathode being made of copper, spaced 1 cm apart, a mixture of 47.5 g of diethylformamide, 4.0 g of terephthalic acid, 5.0 g of dimethyl maleate and 1.0 g of methyltributylammonium methyl sulfate (MTBS) was electrolyzed at 58-61° C. At a constant amperage of 0.2 A, the cell voltage rose during the electrolysis from 13.8 V to 18.0 V. The electrolysis was terminated after 4 h. A pale gray suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 3.5 g (surface area according to Langmuir in accordance with DIN 66135: 10.7 $m^2/g$).

Example 5

Preparation of a Cu-MOF in a Gap Cell

In a $N_2$-blanketed 100 ml glass cylinder equipped with heating jacket, magnetic stirrer, internal thermometer and fitted with two plan parallel copper electrodes (thickness about 2 mm; facing surface areas each 9.9 $cm^2$) spaced 1 cm apart, a solution of 50.0 g of ethanol, 5.3 g of 1,3,5-benzenetricarboxylic acid and 1.0 g of methyltributylammonium methyl sulfate (MTBS) was electrolyzed at 53-58° C. At a constant amperage of 0.2 A, the cell voltage during the electrolysis was 18.0 V to 20 V. The end of the electrolysis could be discerned from a marked voltage rise to above 30 V. It was terminated after 4 h. A dense, turquoise colored suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 6.3 g (surface area according to Langmuir in accordance with DIN 66135: 1260 $m^2/g$).

Example 6

Preparation of a Cu-MOF in a Gap Cell

In a $N_2$-blanketed 100 ml glass cylinder equipped with heating jacket, magnetic stirrer, internal thermometer and fitted with two plan parallel copper electrodes (thickness about 2 mm; facing surface areas each 9.9 $cm^2$) spaced 1 cm apart, a mixture of 50.0 g of methanol, 1.0 g of 2,2'-bipyridine-5,5'-dicarboxylic acid and 0.3 g of methyltributylammonium methyl sulfate (MTBS) was electrolyzed at 51-54° C. At a constant amperage of 0.1 A, the cell voltage during the electrolysis was a stable 6 V. It was terminated after 1.3 h. A gray suspension had formed which settled rapidly. The supernatant solution was colorless. The resulting precipitate was filtered off with suction, washed with methanol a number of times and dried. Yield: 1.4 g. The precipitate had an atomic Cu/N/C ratio of 1:2:12.

Example 7

Preparation of a Co-MOF in a Gap Cell

In a $N_2$-blanketed 100 ml glass cylinder equipped with heating jacket, magnetic stirrer, internal thermometer and fitted with two plan parallel cobalt electrodes (thickness about 2 mm; facing surface areas each 9.9 $cm^2$) spaced 1 cm apart, a mixture of 50 g of methanol, 4.0 g of terephthalic acid and 1.0 g of methyltributylammonium methyl sulfate (MTBS) was electrolyzed at 54-65° C. At a constant amperage of 0.2 A, the cell voltage during the electrolysis was 5 V. It was terminated after 4 h. A pink suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 5 g (surface area according to Langmuir in accordance with DIN 66135: 7 $m^2/g$). In the course of the electrolysis, the electrodes had lost 1.19 g, corresponding to an erosion rate of 1.5 F/Mol of Co.

Example 8

Preparation of a Zn-MOF in a Gap Cell

In a $N_2$-blanketed 100 ml glass cylinder equipped with heating jacket, magnetic stirrer, internal thermometer and fitted with two plan parallel zinc electrodes (thickness about 2 mm; facing surface areas each 0.99 $cm^2$) spaced 1 cm apart, a mixture of 47.5 g of diethylformamide, 4.8 g of 2,5-dihydroxyterephthalic acid, 5.0 g of dimethyl maleate and 1.0 g of methyltributylammonium methyl sulfate (MTBS) was electrolyzed at 52-61° C. At a constant amperage of 0.2 A, the cell voltage gradually rose during the electrolysis from 12.5 V to 37.0 V over a period of 3 h. It was terminated after 4 h. A dense, yellow/beige suspension had formed which settled rapidly. The resulting precipitate was filtered off in a nitrogen stream and washed twice with 50 ml of chloroform. The filter cake was transferred, in a nitrogen atmosphere, to a glass flask and activated in high vacuum (until $5*10^{-5}$ mbar had been reached). Yield: 4.3 g (surface area according to Langmuir in accordance with DIN 66135: 21 m²/g).

Example 9

Preparation of a Cu-MOF in a Plate Stack Cell

Electrolysis was carried out in an electrolytic circuit consisting of a circulating pump, a glass cooler for regulating the temperature of the electrolyte, an off-gas condenser, measuring devices for measuring the flow rate, the cell voltage, the current density and the temperature, and of a plate stack cell. The plate stack cell comprised five round copper disks having an area on each side of 61.9 cm² and a thickness of 5 mm. The disks having a central circular hole with a diameter of 1.5 cm were arranged to form a stack. Spacers separated each electrode from the adjacent electrodes by a 1 mm gap. Cathodic contact was made with the bottom electrode and anodic contact with the top electrode. The three central electrodes each had a cathodic and an anodic side (bipolar configuration). Via the cell bottom plate, the electrolyte was passed through the central cylindrical holes of the plates, flowing through the gaps. Via a glass cap fixed to the bottom plate, the electrolyte was discharged into the cell circuit and anodic contact was effected. The installation had been inerted with nitrogen.

An electrolyte comprising 1075.7 g of methanol, 83.3 g of 1,2,3-benzenetricarboxylic acid and 21 g of MTBS was recirculated in this cell circuit (130 l/h). Electrolysis was carried out at an amperage of 1.3 A and a cell voltage of from 12.6 to 19.1 V and a temperature of 20-23° C. for two and a half hours. The precipitate was filtered off and washed twice with 50 ml of cold methanol. The pale blue precipitate was activated overnight at 120° C., its color changing to dark blue in the process. Yield 43.6 g (surface area according to Langmuir in accordance with DIN 66135: 1649 m²/g).

Example 10

Preparation of a Cu-MOF in a Plate Stack Cell

An experiment analogous to example 9 in ethanol as the solvent afforded a product having a surface area of 1585 m²/g according to Langmuir in accordance with DIN 66135 and a yield of 15.5 g.

Example 11

Preparation of a Cu-MOF in a Tubular Cell

The cell circuit was charged with the electrolyte comprising 144.8 g of 1,3,5-benzenetricarboxylic acid, 38 g of MTBS and 1867.2 g of methanol. The cell circuit consisted of a tubular cell, a glass cooler, a centrifugal pump and a separation vessel underneath the cell. The pump conveyed the electrolyte and the suspension formed in the circuit, the main quantity of the Cu-MOF formed being collected in the separation vessel. The separation vessel consisted of a glass beaker having a volume of 500 ml with a drain at the bottom. The tubular cell consisted of an alloy steel tube (length: 55 cm, internal diameter: 4.1 cm) having a polypropylene cap and a polypropylene bottom. Cap and bottom had orifices for supplying and discharging the electrolyte circulating in the cell circuit. The cap had a screw-sealable port from which the copper anode projected gas tightly. The bottom had a circular recess (diameter corresponding to the anode rod) with a thickness of 3 mm, in which the anode was seated. The cap port and the bottom recess were arranged concentrically with the cross section of the steel cathode, thereby ensuring that the spacing between cathode and anode was homogeneous all round. The copper anode consisted of a copper rod having a length of 100 cm and a diameter of 4 cm, which was tapered in the vicinity of the steel cathode. There it had a diameter of 3.7 cm, corresponding to an active surface area of 639 cm².

At an amperage of 14.5 A and a cell voltage of from 5.6 to 5.9 V, the experiment was continued until a current consumption of 1.5 F/(Mol of benzenetricarboxylic acid) had been reached. Then, the circulation was continued at zero current for a few hours, a large fraction of the MOF suspension being collected in the separation vessel in the process. Thus it was possible to run a number of batches of fresh electrolysis charges one after the other without solids accumulating in the cell or in the cell circuit.

Work-up of these MOF outputs resulted, on average, in 105 to 115 g of solids per batch having surface areas, determined according to Langmuir in accordance with DIN 66135, ranging from 1300 to 1500 m²/g.

Example 12

Preparation of the Tetrapropylammonium Salt of 1,3,5-benzenetricarboxylic Acid

A methanolic solution of 0.35 Mol of 1,3,5-benzenetricarboxylic acid per kg of methanol (7.2 wt %), upon addition of 0.035 Mol of tetrapropylammonium hydroxide, 50% strength in $H_2O$, attained a specific conductivity of 1.0 mS/cm. 10 Mol % of the 1,3,5-benzenetricarboxylic acid had been converted into the monosalt in this solution. The solution contained 7.1 g of water, corresponding to 0.7 wt %.

Example 13

Comparison of Cu-MOFs Prepared According to the Present Invention with Conventionally Prepared Copper-MOFs Two electrochemically prepared Cu-MOFs (EMOF-1 and EMOF-2) are investigated by X-ray absorption spectroscopy and compared with a Cu-MOF prepared according to the prior art (MOF-ST).

EMOF-ST is prepared as follows:

| Material used | Molar | Computed | Experimental |
|---|---|---|---|
| 1) 1,3,5-Benzenetricarboxylic acid | 0.116 mol | 24.4 g | 24.4 g |
| 2) Ethanol | 2.13 mol | 98.5 g | 98.5 g |
| 3) Copper(II) nitrate*2.5 water | 0.233 mol | 54.3 g | 54.3 g |
| 4) Deionized water | 6.94 mol | 125.0 g | 125.0 g |

In each of two autoclave beakers 12.2 g of benzenetricarboxylic acid are suspended in 49.3 g of ethanol by stirring. In each of 2 glass beakers 27.2 g of copper nitrate are dissolved in 62.5 g of water. The copper nitrate solution is then filled into the glass beakers, and a light blue gel forms. It is stirred for 30 min and then the autoclave beakers are sealed.

The crystallization takes place at 110° C. over 18 h.

The precipitate is filtered off and washed 2 times with water. The filter cake is dried at 110° C.

Analysis:

Langmuir surface area: 1316 m$^2$/g measured with N$_2$/77K

Chemical analysis:

Cu: 32%

N: 1.1%

In the case of EMOF-1, 1788.3 g of methanol, 70.0 g of 1,3,5-benzenetricarboxylic acid, 28.6 g of MTBS (60% in methanol) and also a CU electrode are used and the EMOF-1 is obtained similarly to the previous examples.

Langmuir surface area: 1766 m$^2$/g measured with N$_2$/77K.

Thus, MOF-ST and EMOF-1 are directly comparable. It emerges that EMOF-1 has a larger active surface area.

EMOF-2 is prepared similarly to EMOF-1, except that isophthalic acid is used. The hereinbelow more particularly described X-ray absorption-spectroscopic investigation shows that the spectra of the EMOFs have comparable characteristics in the spectra and differ greatly from MOF-ST in that respect.

Sample preparation and the subsequent measurements for X-ray absorption spectroscopy are carried out under the same conditions for all Cu-MOFs.

By way of sample pretreatment, all the samples are alluviated with ethanol onto polyethylene compacts 13 mm in diameter. To stabilize the samples on the PE compacts, these have been packaged in adhesive tape. The measurements of the X-ray absorption spectra were carried out on the E4 beamline of the HASYLAB at DESY. This instrument is equipped with an Si(111) double crystal monochromator and a focusing mirror with gold coating. To further suppress the higher harmonics, a gold-coated plane mirror is used. An additional measurement is carried out at 60% of the maximum intensity of the Bragg peak using a piezo element with feedback control. The following argon pressures are set for the measurement at the Cu K edge: 1st ionization chamber 70 mbar, 2nd ionization chamber 550 mbar and 3rd ionization chamber 800 mbar. This corresponds respectively to absorptions of 10% in the first ionization chamber, of 50% in the second ionization chamber and of almost 100% in the third ionization chamber. A copper foil is measured between the second and third ionization chambers as a reference to calibrate the energy scale.

The measuring programs for the copper edge are:

| Energy/eV | Step size/eV | Measuring time/sec | Edge position | x |
|---|---|---|---|---|
| 8820 | 10 | 0.5 | | |
| 8940 | 0.5 | 0.5 | | |
| 9010 | 0.5 | 0.5 | 8979 | 0.9 |
| 10 000 | | | | |

From the energy for which an edge position is reported, the measurement is carried out in equidistant steps in the k-space using a waiting of the measuring time per step of k$^x$. The sample spectra were measured repeatedly, as were the reference samples.

Data evaluation was carried out using WinXAS 3.1 software (Ressler T., J. Synchrotron Radiat., 5 (1998), 118). Data reduction is effected using standard methods. Energy calibration utilize the E$_0$ of the reference foils which are measured simultaneously at each spectrum. For the XANES range of the copper samples of interest here, polynomials of first order are utilized for the preedges (8.84 keV-8.94 keV) and of 2nd order for the EXAFS range (9.16 keV-9.98 keV) to deduct the background. Normalization is on the edge lift. Converting into the k-space utilizes the 2nd turning point on the edge of the sample spectrum. The μ0 adaptation is effected using a spline function (spline7) in the range of 1.59 k-13.1 k.

Figure 5:
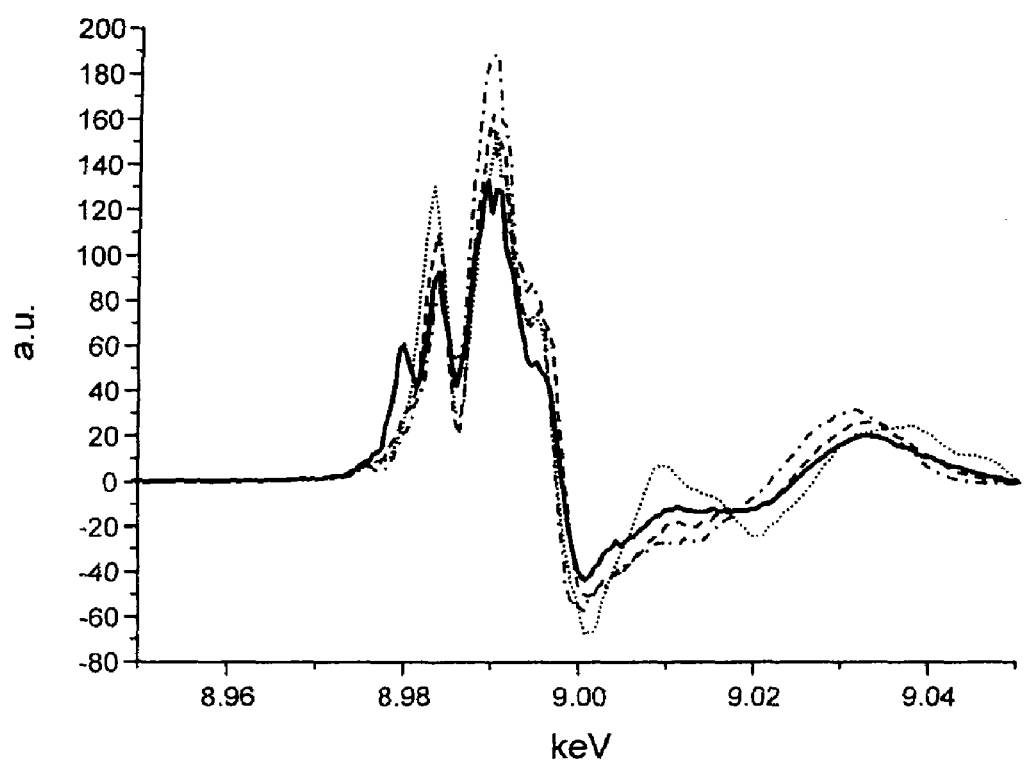

A comparison with the model of tenorite in the space group Cc by means of the EXAFS and the absence of a preedge peak show that the copper has a fourfold planar coordination in all samples. A comparison of the first derivatives of the edges of the samples, however, shows that the MOF-ST sample prepared according to the prior art has an additional maximum at about 8.9798 keV. This is depicted in FIG. 5. The curves are assigned as follows:

——— MOF-ST
—·—·— EMOF-2
— — — EMOF-1
············ Tenorite

This maximum, which corresponds to a turning point in the original absorption spectrum, is not present in the Cu-MOF prepared according to the present invention. A comparison of the sample spectra with that of tenorite further reveals that, owing to the energetically identical positions of the edge structures, the copper is present in a divalent state in the samples investigated. It cannot be ruled out that the MOF-ST sample has a somewhat lower average oxidation state due to the additional turning point on the edge.

A comparison of the X-ray absorption spectra of copper-MOFs produced according to the present invention compared with those produced according to the prior art show distinct differences, so that the MOFs produced according to the present invention are new entities compared with the MOFs produced according to the prior art.

We claim:

1. A crystalline, porous, metal-organic framework material comprising at least one at least bidentate organic compound coordinately bound to at least one metal ion, wherein said framework material is obtained by a process comprising electrochemically preparing the framework material in a reaction medium comprising said at least bidentate organic compound, wherein said at least one metal ion is provided in the reaction medium by the oxidation of at least one anode comprising the corresponding metal.

2. The framework material according to claim 1, wherein the at least one at least bidentate organic compound is selected from the group consisting of dicarboxylic acid, tricarboxylic acid and tetracarboxylic acid.

3. The framework material according to claim 1, wherein the framework material has a specific surface area, determined in accordance with DIN 66135, of greater than or equal to 5 m$^2$/g.

4. The framework material according to claim 1, wherein, during the process, cathodic redeposition of the at least one metal ion is partially prevented by the presence of at least one of the following:

(i) an electrolyte which promotes the cathodic formation of hydrogen;

(ii) at least one compound leading to cathodic depolarization; and (iii) a cathode having a suitable hydrogen overpotential.

5. The framework material according to claim 4, wherein the electrolyte comprises at least one protic solvent.

6. The framework material according to claim 4, wherein the cathodic depolarization is a hydrodimerization.

7. The framework material according to claim 1, wherein the process is implemented in an undivided electrolytic cell.

8. The framework material according to claim 1, wherein the process is implemented in a gap cell or plate stack cell.

9. The framework material according to claim 8, wherein the gap cell or plate stack cell is connected for bipolar operation.

10. The framework material according to claim 1, wherein the reaction medium comprises methanol, ethanol, dimethylformamide, diethylformamide or a mixture of two or more of these.

11. The framework material according to claim 1, wherein the metal ion source is an anode comprising at least one metal selected from the group consisting of copper, iron and zinc.

12. The framework material according to claim 1, wherein the at least bidentate organic compound is an aromatic di, tri- or tetracarboxylic acid.

13. The framework material according to claim 1, wherein the reaction medium comprises at least one conducting salt.

14. The framework material according to claim 13, wherein the at least one conducting salt comprises as the cation component a quaternary ammonium ion and comprises as the anion component an alkoxy sulfate.

15. The framework material according to claim 1, wherein the solids content is in the range of greater than or equal to 0.5 wt %.

16. A crystalline, porous, metal-organic framework material comprising at least one at least bidentate organic compound coordinately bound to at least one metal ion, wherein said material is obtained by a process comprising electrochemically preparing the framework material in a reaction medium comprising said at least bidentate organic compound, wherein said at least one metal ion is provided in the reaction medium by the oxidation of at least one anode comprising the corresponding metal, which comprises partially preventing the cathodic redeposition of the at least one metal ion by the presence of at least one of the following:
  (i) an electrolyte which promotes the cathodic formation of hydrogen;
  (ii) at least one compound leading to cathodic depolarization; and
  (iii) a cathode having a suitable hydrogen overpotential.

17. A storage medium for at least one liquid and/or at least one gas comprising the framework material according to claim 1.

18. A catalyst comprising the framework material according to claim 1.

19. A storage medium for at least one liquid and/or at least one gas comprising the framework material according to claim 16.

20. A catalyst comprising the framework material according to claim 16.

21. A pigment comprising the framework material according to claim 1.

22. A sensor comprising the framework material according to claim 1.

23. An electrical conductor comprising the framework material according to claim 1.

24. An ion conductor comprising the framework material according to claim 1.

25. A pigment comprising the framework material according to claim 16.

26. A sensor comprising the framework material according to claim 16.

27. An electrical conductor comprising the framework material according to claim 16.

28. An ion conductor comprising the framework material according to claim 16.

* * * * *